United States Patent [19]

Stapleford et al.

[11] 4,055,730
[45] Oct. 25, 1977

[54] CIRCUIT FOR DETECTING DIAL PULSES

[75] Inventors: Gary N. Stapleford, Londonderry; Joel E. Sandahl, Derry, both of N.H.

[73] Assignee: Comex Systems, Inc., Hudson, N.H.

[21] Appl. No.: 581,731

[22] Filed: May 29, 1975

[51] Int. Cl.² ............................................. H04M 1/50
[52] U.S. Cl. ................................................. 179/84 VF
[58] Field of Search ............... 179/84 VF, 2 DP, 2 R, 179/2 A; 324/78 D; 340/171 R, 171 A, 171 PF

[56] References Cited

U.S. PATENT DOCUMENTS

| | | | |
|---|---|---|---|
| 3,537,001 | 10/1970 | Friend | 179/84 VF |
| 3,760,269 | 9/1973 | Beeman | 324/78 D |
| 3,790,720 | 2/1974 | Schartmann | 179/84 VF |
| 3,912,869 | 10/1975 | Ullakko | 179/84 VF |
| 3,917,912 | 11/1975 | Niwa | 179/84 VF |

Primary Examiner—Kathleen H. Claffy
Assistant Examiner—Joseph A. Popek
Attorney, Agent, or Firm—Pearson & Pearson

[57] ABSTRACT

A circuit for detecting dial pulses at a receiving telephone transmitted from a sending telephone after the telephones are interconnected. Detecting circuits, including bandpass filters and summing and threshold circuits transmit a probable pulse signal. A probable pulse signal indicates that the signals on the telephone line have the characteristics present whenever the dialing mechanism at the sending telephone is actuated. A digital correlation circuit receives all the probable pulse signals and advances a counter which stores the number representing the dialed digit if a correlation exists.

25 Claims, 4 Drawing Figures

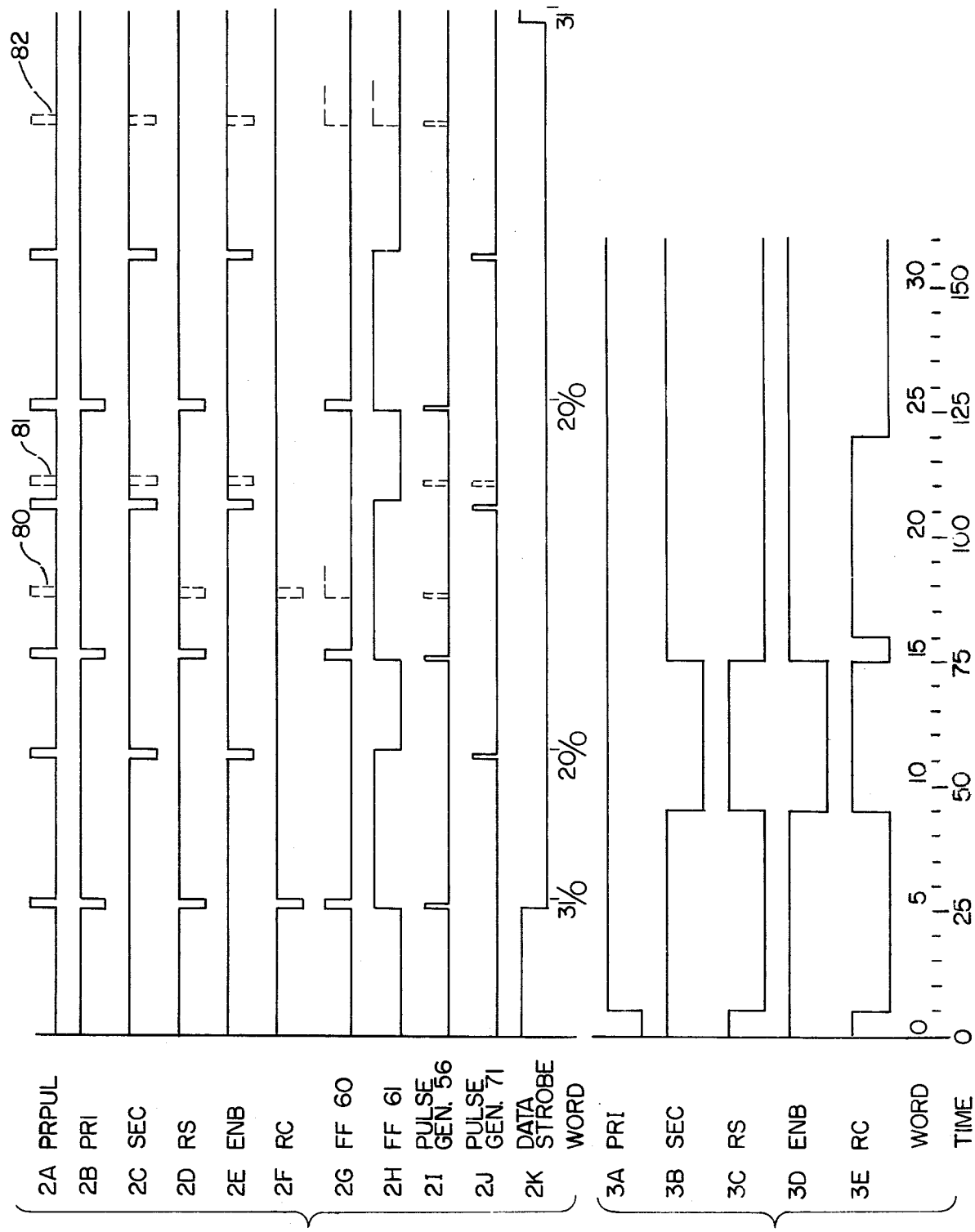

CIRCUIT FOR DETECTING DIAL PULSES

BACKGROUND OF THE INVENTION

This invention generally relates to the transmission of information over telephone lines by using a telephone dial actuator to transfer information over a telephone from a sending telephone to a receiving telephone. These circuits have application in digital computer systems, call forwarding systems, remote dialing systems, paging systems, and credit card verification systems for example. In all these applications, the dial pulses must be counted accurately for reliable operation.

However, the path between a sending and receiving telephone may include many elements including myriad switching centers, amplifiers and other electrical circuits and electromechanical mechanisms. All these elements are sources of distortion and electrical noise. Atmospheric and other disturbances also can distort the signals and inject noise. All these factors tend to degrade the input signal and increase the difficulty in detecting dial pulses reliably.

In one prior dial pulse detector circuit, it is assumed that each dial pulse produces a transient pulse which a simple amplitude detector can discriminate as a dial pulse. A counter or other storage device stores information concerning the number of dial pulses which are received.

In another detection circuit, the high frequency content of signals on the telephone line is monitored to indicate the presence of tentative pulses with the characteristics of dial subpulses produced each time the dial actuator contacts open and close. An analog timing circuit establishes a timing window in response to a tentative pulse. The window is wider than the interval between successive dial subpulses but is narrower than the interval between corresponding dial subpulses of successive digits when a number greater than 1 is dialed.

The simple amplitude detection circuit is useful when both the sending and receiving telephones are connected through a single switching center. If several switching centers are intermediate the telephones, the amplitude of transients reduces and makes detection more difficult. The other detection circuit, which uses the analog timing circuits, is more reliable than the amplitude detection circuit. However, it is a rather complex circuit. Further, as all the components are fixed, it is difficult to alter the response or operation of this circuit, as may be desirable in some applications.

Therefore, it is an object of this invention to provide a pulse detection circuit for detecting pulses which conform to a known pattern in which the pattern can be altered easily.

Another object of this invention is to provide an improved circuit for detecting dial pulses produced on a telephone line.

SUMMARY

In accordance with one aspect of this invention, an analog circuit transmits a probable pulse each time the detection circuit receives signals having known characteristics. A digital correlator establishes a known pattern of control signals in sequence. Each probable pulse transfers control signals to a correlation circuit which determines whether the received probable pulses correlate to the known pattern.

More specifically, a dial pulse detection circuit constructed in accordance with this invention, receives incoming signals from a telephone line after a telephone connection is made. A plurality of bandpass filters and detecting circuits together with other circuitry produce a probable dial pulse each time the signals on the telephone line have the frequency characteristics of a dial pulse. A memory in the digital correlator circuit stores, in successive locations, signals which correspond to the timing pattern of successive dial pulses. A sequential addressing circuit responds to a first probable dial pulse to address each location in sequence. If a next probable dial pulse corresponds to the pattern, then a correlation is indicated. If all the probable dial pulses for a digit correlate to the pattern, the dialed number is stored.

This invention is pointed out with particularity of the appended claims. The above and further objects and advantages of this invention may be better understood by referring to the following description taken in conjunction with the accompanying drawings.

BRIEF DESCRIPTION OF THE DRAWINGS

FIG. 2 is a timing diagram to facilitate an understanding of the circuit in FIG. 1; and FIG. 3 is a graphical analysis of the pattern stored in a pattern memory in FIG. 1.

DESCRIPTION OF AN ILLUSTRATIVE EMBODIMENT

In the disclosed embodiment of this invention a dial pulse detection circuit senses and counts a number dialed during an overdialing operation. Overdialing is the process of using a dial actuator at a sending telephone after telephone communications are established with a receiving telephone. In a conventional dial actuator, dialing contacts open and close for each digit that is dialed; that is, if a person overdials 3, the dialing contacts open and close three times. The overdialing operation normally occurs so rapidly that various timing circuits in the interconnecting network do not disconnect the telephones.

Each time the dialing contacts open or close, they produce a disturbance on the telephone line. When a person overdials 3, the actuator contacts produce six pulse disturbances on the line. These dial pulse disturbances have certain frequency and timing characteristics which are relatively invariant among various telephones and are independent of the interconnecting network.

Specifically, each dial pulse disturbance produces a complex wave which contains predominant energy levels at about 110 Hz, 220 Hz and 440 Hz. When people talk over the telephone, the predominant energy lies in a frequency range above 440 Hz. Each dial pulse disturbance corresponds to the leading or trailing edge of a dial pulse and, in this discussion, these dial pulse disturbances are denoted as "primary" and "secondary" disturbances respectively. These disturbances have known timing characteristics. For example, the time interval between a primary and successive secondary disturbance is 60 milliseconds, plus or minus 15%. The interval between successive primary disturbances when the dialed number is greater than 1 is 100 milliseconds, plus or minus 15%. Finally, the interval between the last primary pulse produced during a single dialing operation and the first primary disturbance in a subsequent dialing operation is about 150 milliseconds.

Figure 1A:
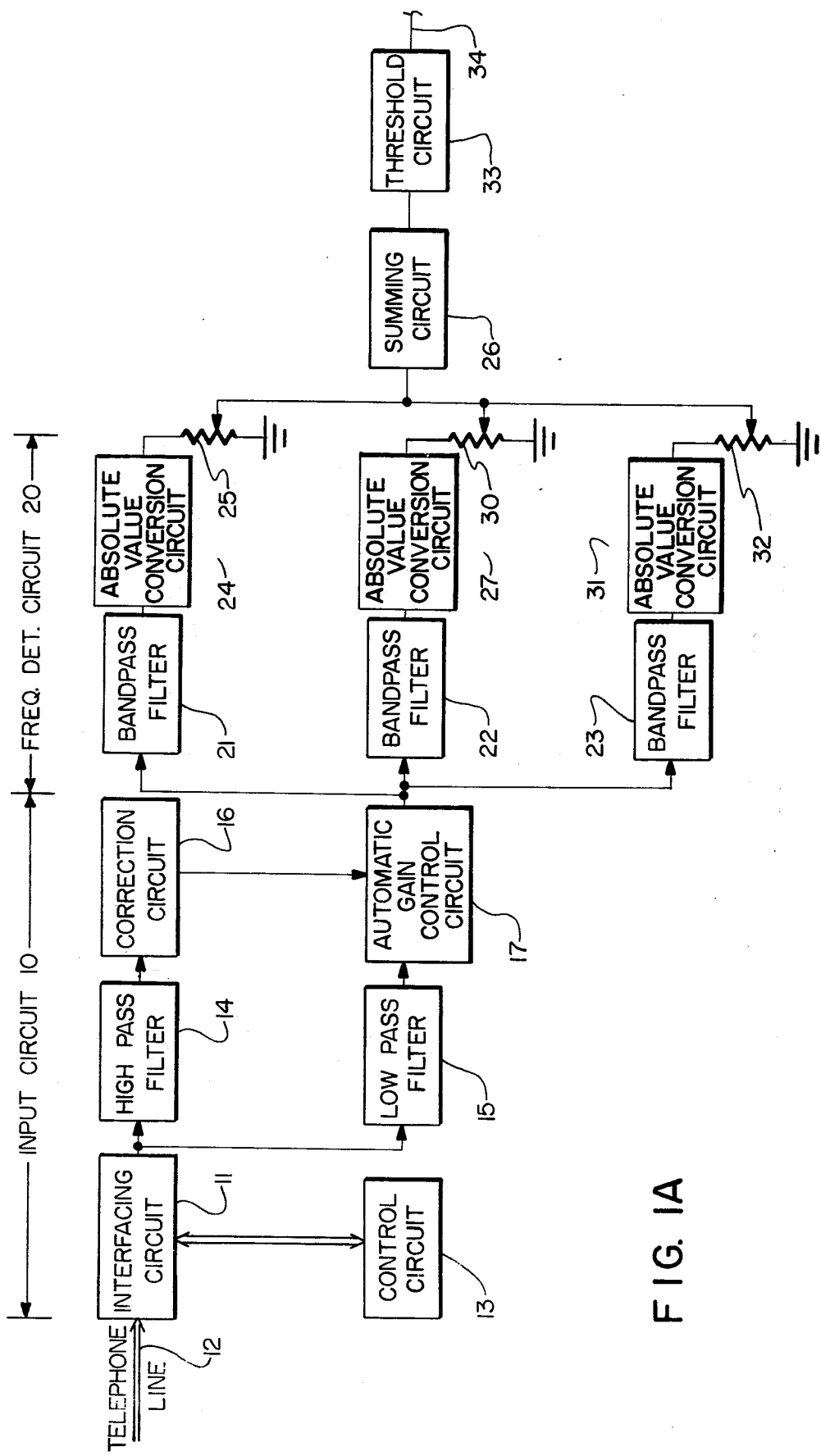
FIG. 1 comprises FIGS. 1A and 1B and is a schematic diagram, partially in block form, of a dial pulse detection circuit incorporating this invention.
Figure 1B:
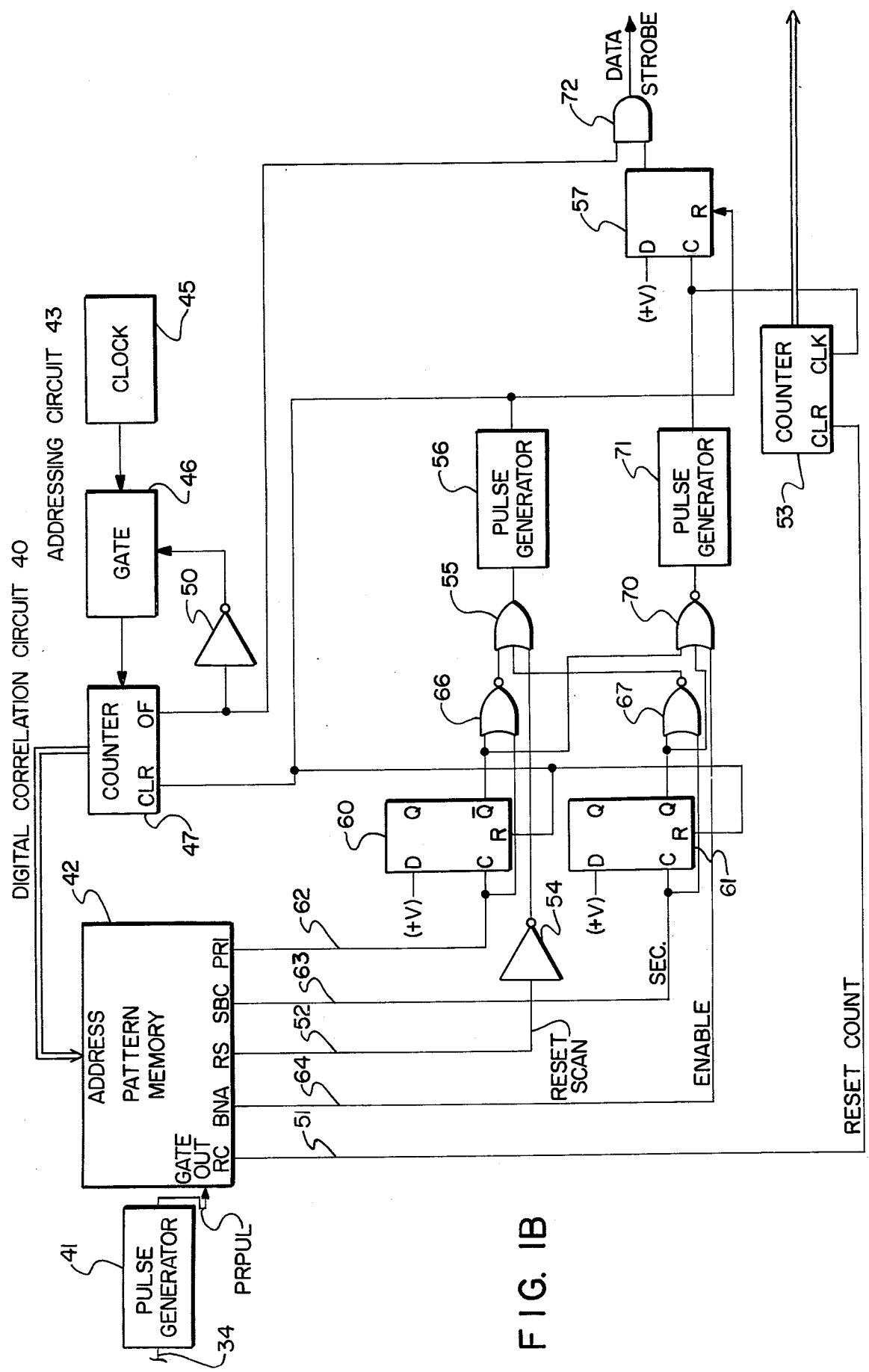

The circuit shown in FIG. 1A responds to these frequency characteristics of dial pulse disturbances while the circuit in FIG. 1B determines whether the timing of detected dial pulse disturbances correlate to these timing characteristics.

Now referring to FIG. 1A, an input circuit 10 at a receiving telephone (not shown) includes an interfacing circuit 11 for receiving signals from the telephone line 12. The interfacing circuit 11 and a control circuit 13 responds to an incoming ringing signal to establish communications with a sending telephone and couple the signals on the telephone line 12 to a high pass filter 14 and a parallel low pass filter 15.

As previously indicated, the dial pulse disturbances lie in a low frequency band, so the cut-off frequencies for the filters 14 and 15 are selected to be above this frquency. In one specific embodiment the cut-off frequency is about 550 Hz for both filters 14 and 15. If a high energy level exists above this cut-off frequency, it is assumed that voice signals are present. A correlation circuit 16 produces a gain control signal in response to the signal from the high pass filter 14. This gain control signal establishes the gain in an automatic gain control circuit 17 which couples the signals from the low pass filter 15 to a frequency detecting circuit 20. Normally, overdialing occurs without any voice signals, so the circuit 17 operates at a high gain. If voice signals are present, the gain is decreased, so higher energy levels in the characteristic frequency bands are necessary to detect a dial pulse.

Several parallel bandpass filters 21, 22 and 23 in the frequency detecting circuit 20 receive the output signal from the automatic gain control circuit 17. Each bandpass filter has a midfrequency at one of the characteristic frequencies; i.e., 110 Hz, 220 Hz, and 440 Hz. In one embodiment the quality factor of each bandpass filter is about 25. If there is energy at 110 Hz, an absolute value conversion circuit 24 and a scaling circuit in the form of a potentiometer 25 provide one input to a summing circuit 26. Likewise, the bandpass filter 22, an absolute value conversion circuit 27 and potentiometer circuit 30 provide a second input to the summing circuit 26 which indicates the energy level in the 220 Hz pass band. The bandpass filter 23, absolute value conversion circuit 31 and a potentiometer 32 provide a third input signal which indicates the energy level in the 440 Hz passband.

When the output of the summing circuit 26 exceeds a threshold level, a threshold circuit 33 produces an output signal. As the interval for this signal is relatively short, it is considered to be a probable dial pulse. In one embodiment, the potentiometers 25, 30 and 32 are adjusted so the output from the summing circuit 26 does not exceed the threshold unless the summing circuit 26 receives some minimum level signal at all its inputs. Thus, the threshold circuit 33 produces on a conductor 34 a probable pulse in response to each dial pulse disturbance on the telephone line 12. However, at other times, there may appear random disturbances with the frequency characteristics of a dial pulse disturbance. A probable pulse also appears on the conductor 34 in response to these random disturbances. A digital correlation circuit 40, shown in FIG 1B, minimizes errors caused by such random disturbances.

Now referring to FIG. 1B, the digital correlation circuit 40 receives all probable pulses which appear on the conductor 34. Each incoming probable pulse triggers a pulse generator 41, to produce a PRPUL pulse which is shown in Graph 2A in FIG. 2. In the following discussion, a PRPUL pulse transmitted in response to a primary disturbance is designated a primary PRPUL pulse, while a secondary PRPUL pulse corresponds to a secondary line disturbance. Thus, if a person overdials 3, the pulse generator 41 transmits, in an alternate sequence, three primary and three secondary PRPUL pulses.

Each PRPUL pulse enables a pattern memory 42 to transmit at an output pattern of control signals which depend upon states of a particular location then identified by incoming ADDRESS signals. In the absence of a PRPUL pulse, the output signals are at non-assertive, positive levels.

Still referring to FIG. 1B, an addressing circuit 43 produces, in a periodic sequence, the ADDRESS signals. A clock 45 produces periodic clocking pulses. A gate 46 normally couples these clock pulses to a counter 47. The modulus of the counter 47 corresponds to the number of locations in the pattern memory 42. When the ADDRESS signals identify the last location, the counter 47 transmits an overflow (OF) signal. An inverter 50 disables the gate 46 in response to the OF signal. In one specific embodiment, the pattern memory comprises a programmable read-only memory that contains 32 locations (i.e., locations 0 through 31) and the clocking pulses are produced at 5 millisecond intervals. Thus, at the end of a correlation operation the counter 47 stores 31 and transmits the OF signal.

In this specific embodiment, the pattern memory 42 stores 5 bits of information in each location which correspond to the characteristics of the known pattern. As shown in FIG. 3A, a PRI bit location contains a ZERO in word location 0 and ONE's in all the remaining locations. Each of locations 9 through 14 contains a ZERO in a SEC bit position as shown in Graph 3B, and at the clock rate, this corresponds to the interval during which a secondary dial pulse should occur. A ZERO is stored in each of the RS bit position locations 1 through 8 and 15 through 31 (FIG. 3C) while an ENB bit position contains a ZERO in each of locations 9 through 14 (FIG. 3D). The last bit position (FIG. 3E) is designated an RC bit and contains a ZERO in each of locations 1 through 8, 15, and 24 through 31. Thus, FIG. 3 represents the control signals which appear at the output of the pattern memory 42 assuming that the PRPUL pulse activates a GATE OUT terminal which enables the output conductors. At a 5 millisecond clock rate, FIG. 3 corresponds to total elapsed time of 160 milliseconds for the 32 words. As appears more fully in the following discussion, the PRI, SCC, ENB, and RC control signals define all the timing characteristics for any valid overdialing operation.

A description of a specific example of overdialing 3, assuming that no random disturbances occur, will facilitate an understanding of the circuit shown in FIG. 1B. Specifically, the pulse generator 41 transmits a primary PRPUL pulse as shown in Graph 2A in response to the first primary disturbance. In one embodiment, each PRPUL pulse is a 3-millisecond pulse. As the ADDRESS signals designate location 31, negative-going RC and RS (Graphs 3E and 3C) appear on output conductors 51 and 52 respectively. The RC pulse on conductor 51 clears a counter 53 which stores the digit which is dialed at the end of an overdialing operation. As shown in Graph 2I, an inverter 54 energizes an OR gate 55 and triggers a pulse generator 56 in response to the RS pulse. The pulse generator 56 transmits a pulse which is shorter than the pulse from the generator 41 (e.g., 1 millisecond). This pulse clears the counter 47 and D-type flip-flops 57, 60 (Graph 2G) and 61 (Graph 2H). Graphs 2G and 2H reflect the signal at the $\overline{Q}$ output terminals of the flip-flops 60 and 61.

At this clearing pulse terminates before the pulse from the pulse generator 41 terminates, the output from the pattern memory 42 shifts to produce control signals corresponding to the bits in location O. As shown in FIG. 2, at location O, the PRI output on a conductor 62 shifts to ZERO value. As shown in Graphs 3C and 3D the RS and RC signals are at a positive level, so the inverter 54 disables the pulse generator 56. The SEC signal on a conductor 63 and ENB signal on conductor 64 remain unchanged as shown in Graphs 3B and 3D.

When the primary PRPUL pulse terminates, the PRI signal returns to a positive level. Thus, the PRPUL pulse produces a negative-going PRI pulse shown in Graph 2B which is substantially co-extensive with the PRPUL pulse. The trailing edge of the PRI pulse sets the flip-flop 60 (Graph 2G). The changes in the input signals to a NOR gate 66 do not alter its output signal, which is a logic ZERO level signal.

The next PRPUL pulse in sequence is a secondary PRPUL pulse and occurs as the counter 47 addresses word location 12. The resulting PRPUL pulse produces on the conductors 63 and 64, negative-going SEC and ENB pulses (Graphs 2C and 2E) reflecting the contents of the pattern memory 42 (FIG. 3). The trailing edge of the SEC pulse on conductor 63 sets the flip-flop 61. As was true with the NOR gate 66, the output of a NOR gate 67 remains at a logical ZERO level through this transition. The ENB signal on conductor 64 also shifts to a logical ZERO for the duration of the PRPUL pulse, so NOR gate 70 triggers a pulse generator 71 as shown in Graph 2J. The resulting pulse, which also has a duration of about 1 millisecond, advances the counter 53 to a count of 1 and sets the flip-flop 57. Although the flip-flop 57, when set, enables an AND gate 72, it is not energized because the OF signal from the counter 47 is inactive. Therefore, no DATA STROBE signal (Graph 3K) appears at the output of the AND gate 72.

A next primary PRPUL pulse occurs when the counter 47 addresses location 20 to produce a PRI pulse on conductor 52. Thus, the pulse generator 56 (Graph 2I) clears the counter 47 and resets the flip-flops 57, 60 (Graph 2G) and 61 (Graph 2H). However, the RC bits at locations 20 and 0 are ONE's so the counter 53 is not cleared and retains its count of 1. The next secondary PRPUL pulse (Graph 2A) causes negative-going SEC and ENB pulses to appear on conductors 63 and 64 (Graphs 2C and 2D) and trigger the pulse generator 71 (Graph 2H). Thus, the counter 53 advances to a count of 2. The next pair of PRPUL pulses in sequence cause a similar operation and the counter advances to 3.

During any sequences of probable pulses the pulse generator 71 transmits pulses which advance the counter 53 so long as the pulse pattern correlates to the pattern shown in FIG. 3. After the last probable dial pulse has been detected, the counter 47 advances until it addresses the location 31. At this point, the OF signal from the counter 47 disables the gate 46. As the flip-flop 57 is set, the OF signal also energizes the AND gate 72 and transmits the DATA STROBE signal which causes a transfer of the number in the counter 53 to that equipment.

Referring again to FIG. 2, there are shown in phantom, three random PRPUL pulses 80, 81 and 82 which are examples of different random pulses which might occur during an operation. The random PRPUL pulse 80 occurs while the counter 47 in FIG. 1B identifies word location word 5. As can be seen from FIG. 3, negative-going RS and RC signals appear on conductors 51 and 52 (FIG. 1B and Graphs 2D and 2F). The RS pulse triggers the pulse generator 56 thereby resetting the flip-flops 57, 60 (Graph 2G) and 61 (Graph 2H) and clearing the counters 47 and 53. There is no DATA STROBE SIGNAL (Graph 3K).

If a random PRPUL pulse such as that designated by numeral 81 occurs shortly after the flip-flop 61 sets (Graph 2H) when the addressing circuit 47 addresses location 14, a negative-going SEC pulse on conductor 63 (Graph 2C) conditions the NOR gate 67 to trigger the pulse generator 56 to reset the circuitry as previously described.

The random PRPUL pulse 82, which occurs while the counter 47 addresses location 23, produces an RS pulse signal (Graph 2D) to clear the counter 47 and an RC pulse (Graph 2E) to clear the counter 53. As the flip-flops 60 and 61 both are set prior to this interval, the pulse generator 56 clears both flip-flops 60 and 61 as well as the flip-flop 57.

Therefore, it now will be apparent that the digital correlation circuit 20 compares incoming pulses to assure that they match the known pattern and responds to random pulses outside the pattern to clear the counter 47. Thus, the number which is stored more reliably indicates the number of dial pulses. The basic digital correlation circuit 40 shown in FIG. 1B has uses in many other applications where an incoming pulse sequence has identifiable characteristics. It is merely necessary to adapt the correlation circuit, comprising the flip-flops 60 and 61 and related gating circuits in accordance with the desired pattern. It is relatively easy to alter the timing of any pattern merely by reprogramming appropriate bit positions in the pattern memory 42. For example, if it is desirable to trigger the pulse generator 71 after a secondary pulse, the ENB bits in each location are altered. If a ZERO were to appear only in location 15, the ENB signal would trigger the pulse generator 71 after the interval of a valid SEC pulse.

The foregoing description is of a particular dial pulse detection circuit for use in specific application. It will be apparent, however, that these circuits can be modified either for detecting dial pulses differently or for use in a diverse application requiring time or frequency correlation. Therefore, it is the object of the appended claims to cover all such variations and modifications as come within the true spirit and scope of this invention.

We claim:

1. A circuit for correlating an incoming sequence of pulses and a known pulse pattern, said correlation circuit comprising:
   receiving means for transmitting a sequence of probable pattern pulses in response to the incoming sequence of pulses, each probable pattern pulse corresponding to the incoming pulses,
   pattern means for providing, in a timed sequence, a plurality of control signals which correspond to the known pulse pattern, said receiving means enabling said pattern means to transmit the control signals in response to each probable pattern pulse, means responsive to a first probable pattern pulse in the sequence for synchronizing the operation of said pattern means and the probable pattern pulses, and correlation means responsive to said control signals transmitted by said pattern means upon receipt of successive probable pattern pulses from said receiving means for indicating whether the incoming pulse sequence correlates to the known pulse pattern.

2. A correlation circuit as recited in claim 1 wherein said receiving means comprises a pulse generator triggered in response to each incoming pulse.

3. A correlation circuit as recited in claim 2 wherein said pulse generator transmits a probable pattern pulse which has a time interval which is less than the normal interval of each incoming pulse.

4. A correlation circuit as recited in claim 1 wherein said pattern means comprises:
   a memory for storing signals corresponding to a pattern in successive locations,
   clock means, and
   an addressing circuit responsive to said clock means for providing a sequence of addresses to said memory, the control signals from said pattern means corresponding to the signals stored at a location addressed by said addressing circuit at the time of a probable pattern pulse.

5. A correlation circuit as recited in claim 4 wherein:
   said addressing circuit includes means for transmitting a last location signal, and
   said pattern means includes gating means for coupling signals from said clock means to said addressing circuit, the last location signal disabling said gating means.

6. A correlation circuit as recited in claim 4 wherein said pattern means transmits a reset scanning signal as one control signal, said synchronizing means including a pulse generator responsive to a first reset scanning pulse for clearing said addressing circuit and said correlation means.

7. A correlation circuit as recited in claim 4 wherein the known pulse pattern has at least two characteristics, said correlating means including:
   sequence memory means for storing a sequence of events,
   pulse generator means connected to said sequence timing means for transmitting a valid pulse signal in response to the proper storage of a sequence, and
   gating means responsive to said synchronizing means for transmitting a resetting pulse for clearing said sequence memory means.

8. A correlation circuit as recited in claim 7 wherein said pattern means transmits a reset storage signal as another control signal and said correlation circuit additionally comprises pulse storage means cleared by the reset storage signal and responsive to each correlated pulse signal for storing information concerning the incoming pattern.

9. A correlation circuit as recited in claim 8 adapted for transferring the contents of said pulse storage means to a utilization means in response to a transfer timing signal, said correlation circuit additionally comprising means responsive to the addressing circuit and to said valid pulse generator for transmitting a transfer timing signal when a correlation exists.

10. A dial pulse detection circuit for detecting dial pulses transmitted over a telephone line by dialing a digit on a telephone dial actuator, said detection circuit comprising;
   input means connected to the telephone line for receiving signals including dial pulse signals therefrom,
   a plurality of detecting means connected to said input means, each said detecting means transmitting an output signal indicative of the amount of energy in a predetermined passband,
   probable pulse means for transmitting a probable dial pulse in response to the output signals from all of said detecting means,
   pattern means for providing, in a timed sequence, a plurality of control signals which correspond to a known dial pulse pattern, said pattern means being enabled to transmit the control signals in response to each probable dial pulse,
   correlation means responsive to the control signals transmitted by said control pattern means upon receipt of successive probable dial pulses for indicating whether the incoming dial pulse sequence correlates to the known dial pulse pattern, and
   digit storage means responsive to said correlation means for storing a number representing the digit dialed on the telephone dial actuator when a correlation exists.

11. A dial pulse detection circuit as recited in claim 10 wherein said input means includes:
   a low pass filter for coupling signals on the telephone line including probable dial pulse signals,
   an automatic gain control circuit for coupling the signals from said low pass filter to said detecting means, the gain of said automatic gain control circuit being responsive to a gain control signal, and
   high pass filter means for transmitting the gain control signal in response to signals on the telephone line.

12. A dial pulse detection circuit as recited in claim 11 wherein each of said detecting means includes a bandpass filter, said bandpass filters have mid-frequencies at substantially 110 Hz, 220 Hz and 440 Hz.

13. A dial pulse detection circuit as recited in claim 10 wherein said probable pulse means includes:
   a summing amplifier for receiving the output signals from said detecting means, and
   a threshold circuit connected to the output of said summing amplifier.

14. A dial pulse detection circuit as recited in claim 13 additionally comprising a signal scaling means connected between each of said detecting means and said summing amplifier for controlling the relative magnitudes of the signals to said summing amplifier.

15. A dial pulse detection circuit as recited in claim 10 wherein the dial actuating causes a primary dial pulse and a secondary dial pulse to appear on the telephone line, said probable pulse means transmitting an output signal for each primary and secondary dial pulse.

16. A dial pulse detection circuit as recited in claim 15 wherein said probable pulse means comprises a pulse generator connected to said threshold circuit for transmitting primary and secondary probable pulses in response to each incoming dial pulse.

17. A dial pulse detection circuit as recited in claim 15 wherein said pattern means comprises:
   a memory for storing signals corresponding to the known pulse pattern in successive storage locations,
   clock means, and
   an addressing circuit responsive to said clock means for providing a sequence of addresses to said memory, the control signals from said pattern means corresponding to the signals stored at a location addressed by said addressing circuit at the time of each primary and secondary probable pulse.

18. A dial pulse detection circuit as recited in claim 17 wherein said pattern means transmits a primary signal, a secondary signal and an enabling signal as control signals which correspond to the timing of valid primary and secondary dial pulses, said correlation means including;
 a primary latch and a secondary latch, each of said latches, in normal operation, remaining reset during correlation, and
 means responsive to primary and secondary latches and the enabling signal for transmitting a valid dial pulse signal to indicate correlation.

19. A dial pulse detection circuit as recited in claim 18 wherein said storage means comprises a counter, each valid dial pulse from said correlation means advancing said counter.

20. A dial pulse detection circuit as recited in claim 18 wherein said pattern means can transmit a reset scanning signal as another control signal and said correlation means including means for transmitting a reset pulse to clear said counter and said primary and secondary latches in response to the reset scanning signal, said memory transmitting the reset scanning pulse if a probable pulse occurs outside an interval defined for the receipt of a second primary pulse after a valid primary and secondary pulse pair have been received.

21. A dial pulse detection circuit as recited in claim 18 wherein said pattern means can transmit a reset counter signal as another control signal, said digit storage means being cleared in response to the reset counter signal.

22. A dial pulse detection circuit as recited in claim 18 wherein:
 said addressing circuit includes means for transmitting a last location signal for disabling said clock means, and
said circuit additionally comprises a data strobe generator enabled by said location signal to effect a transfer from said digit storage means.

23. A dial pulse detection circuit for detecting pulses with the characteristics of dial pulses transmitted over a telephone line by dialing a digit on a telephone dial actuator, said detection circuit comprising:
 input means connected to the telephone line to receive signals including dial pulses therefrom,
 a plurality of detecting means connected to said input means, each detecting means comprising a bandpass filter connected to receive signals from said input means and an absolute value conversion circuit in series with said bandpass filter, said bandpass filters having mid-frequencies at a reference frequency and the second and fourth harmonics thereof,
 summing means,
 a scaling means connecting the output of each of said absolute value conversion circuits to said summing means, and
 threshold means responsive to the output from said summing means for transmitting a probable pulse indicating that pulse with the characteristics of a dial pulse has been received.

24. A dial pulse detection circuit as recited in claim 23 wherein the reference mid-frequency is substantially 110 Hz.

25. A dial pulse detection circuit as recited in claim 23 wherein said input means includes:
 a low pass filter for coupling signals on the telephone line including the pulses to be detected,
 an automatic gain control circuit for coupling the signals from said low pass filter to said detecting means, the gain of said automatic gain control circuit being responsive to a gain control signal,
 a high pass filter for transmitting the gain control signal in response to the signals on the telephone line, the gain control signal reducing the gain of said automatic gain control circuit as the energy in the passband of said high pass filter increases.

* * * * *